(12) United States Patent
King

(10) Patent No.: US 7,024,288 B1
(45) Date of Patent: Apr. 4, 2006

(54) METHOD FOR GENERATING ROCKET MOTOR DATA PROFILES FOR FIRINGS AT VARIOUS TEMPERATURES

(75) Inventor: John M. King, King George, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 141 days.

(21) Appl. No.: 10/714,351

(22) Filed: Nov. 17, 2003

(51) Int. Cl.
*G05D 1/00* (2006.01)
*G05D 3/00* (2006.01)
*F42B 10/00* (2006.01)
*F41G 7/00* (2006.01)

(52) U.S. Cl. .................. 701/13; 102/202; 102/501; 434/12; 434/14

(58) Field of Classification Search ............ 701/2, 701/7, 13, 1, 3; 244/3.1, 3.11; 250/203.6; 102/202, 501; 434/12, 14
See application file for complete search history.

(56) References Cited

U.S. PATENT DOCUMENTS 6,290,505 B1    9/2001    Garcia ..................... 434/300
6,317,658 B1   11/2001    Vian ........................ 701/1

OTHER PUBLICATIONS

NACA Research Memorandum:By Sanford Gordon and Vearl N. Huff. Theoretical Performance of Lithium and Fluorine as a Rocket Propellant, May 10, 1951—AeroPocket.com Technology; Rocket Motor Test Stand(RMTS).

*Primary Examiner*—Yonel Beaulieu
(74) *Attorney, Agent, or Firm*—Fredric J. Zimmerman

(57) ABSTRACT

A method for generating predictions of rocket motor ballistic performance at specific firing temperatures and for generating data profiles for analysis. The method requires generally available specifications for the rocket motor to be tested and test data from one or more test firings at a known temperature. The method is implemented in software form and generates pressure and thrust versus time data at a selected temperature. The method generates a burnback profile with a correct final web that integrates to the correct final propellant weight as well as a throat area profile and thrust coefficient profile, for the test firing temperature and for the temperature to be predicted.

15 Claims, 14 Drawing Sheets

METHOD FOR GENERATING ROCKET MOTOR DATA PROFILES FOR FIRINGS AT VARIOUS TEMPERATURES

STATEMENT OF GOVERNMENT INTEREST

The invention described herein may be manufactured and used by or for the Government of the United States of America for governmental purposes without payment of any royalties thereon or therefor.

BACKGROUND a. Field of Invention

The present invention relates to generating rocket motor burnback data, pressure versus time, and thrust versus time data for various firing temperatures, using generally available specifications of the rocket motor and test firing data.

b. Background

In order to simulate the ballistics performance of a particular rocket motor, it is necessary to have a burnback profile. A burnback profile is developed by plotting the burn surface area as a function of the linear web burned. FIGS. 7, 9, 11 and 13 are examples of burnback profiles. The area under the curve equals the volume of propellant burned. The curve is unique for each different rocket motor and is a function of the geometry of the propellant grain. The burnback profiles are generally available only to those personnel intimately familiar with the design and development of the motor. Even when such detailed information is available, correction factors which are often unique for a given temperature must be applied to produce a valid model of ballistics performance. Test data from actual firings can be used to plot the curve and produce a burnback profile but rocket motors are normally tested at extreme temperatures only and actual firing test data is generally not available for temperatures within the normal range of use, for the rocket motor. It would be expensive and impractical to conduct a series of test firings, for each rocket motor, in order to obtain representative data for a spectrum of temperatures, so that curves could be generated from the data, for representative firing temperatures.

Computer models have been developed to take advantage of the available test data, for firings at extreme temperatures, and to produce a predicted curve. U.S. Pat. No. 6,290,505 to Garcia-uses a thrust versus time curve from a test firing and proportionally expands or contracts the base line to an interpolated ending point for a temperature, for which the data is to be modeled. A computer program produces a thrust-time curve having the same basic shape and equivalent impulse (area under the curve). The interpolation approach used in the Garcia '505 patent is more of a graphical re-proportioning of the thrust-time curve.

There remains a need for a method and a computer model which can mathematically develop an accurate curve and data profiles for a temperature different from those temperatures for which firing test data is available.

SUMMARY OF THE INVENTION

It is an object of the present invention to provide a method and implementation by computer model, which can mathematically develop an accurate curve for a temperature different from those temperatures for which firing test data is available.

It is a further object of the present invention to provide the computer model in the form of software which requires only readily available data from the rocket motor specifications and test firing data.

In accordance with the objects, the present invention is a method for predicting rocket motor ballistic performance at a user-selected firing temperature. The method generally involves processing the pressure and thrust data through a number of iterative steps to generate burnback profile data. First the method uses measured pressure data and varies the coefficients of a throat erosion equation so that the calculated final throat diameter matches user input data. Then the method takes the measured pressure data and varies the reference burn rate until the final calculated web burned matches a user input value. Finally, the method uses the measured pressure data, along with the calculated burn rate and throat area data, and varies the characteristic velocity until the area under the burn surface versus web burned curve equals the user input propellant weight. The result is a burnback profile with the correct final web that integrates to the correct propellant weight. This burnback profile, throat area profile, and thrust coefficient profile are useful in and of themselves for many engineering analyses. Moreover, once the input burnback profile has been generated, the temperature dependent variables are adjusted and iterative processes similar to those used to generate the burnback profile are used to generate output pressure and thrust versus time data at the output temperature. A more detailed outline of the foregoing method steps is as follows:

First, the method develops data profiles at a test firing temperature, comprising the following steps:

$1^{st}$: Receive input of data from an actual test firing, including firing temperature, initial throat diameter, final throat diameter, pressure versus time and thrust versus time and input of data from rocket motor specifications including propellant weight, propellant density data for a range of temperatures, web thickness, pressure exponent data for a range of temperatures, thermal expansion coefficient, and temperature sensitivity coefficient;

$2^{nd}$: Process the pressure data in an equation for the change in the throat diameter, radius, or area, attributable to erosion by making repeated calculations, in an iterative process varying the coefficient in the expression for the rate of erosion, and solving for the incremental change in throat dimension as a function of chamber pressure during an incremental time period. The calculations are made for values of throat dimension from the known initial dimension to the known final dimension. The result of the process yields a selected correct coefficient in the expression for throat erosion as a function of chamber pressure.

$3^{rd}$: Calculate an array of time incremental values of throat dimension with the selected coefficient of throat erosion.

$4^{th}$: Process the pressure and pressure exponent data in an iterative operation, using an equation for the burn rate as a function of incremental chamber pressure, reference pressure, a reference burn rate and a pressure exponent and a second equation which gives the linear web burned as a function of the burn rate and the time elapsed, said process varying the reference burn rate, in the equation for linear web burned to solve for the total linear web burned and selecting the reference burn rate which produces a total linear web burned matching the user input value for web thickness. Solve the equation for linear web burned for incremental times, using the selected reference burn rate to yield an array of linear web burned values at the test firing temperature.

5$^{th}$: Process the pressure data with the calculated throat dimension data in an iterative operation, varying the characteristic velocity, in an expression for incremental propellant weight burned as a function of pressure, characteristic velocity and throat dimension, to solve for a total propellant weight burned and selecting the characteristic velocity which produces a total propellant weight burned matching the user input value for propellant weight. Solve an equation for incremental burn surface using the selected characteristic velocity and reference burn rate to yield an array of incremental burn surface values at the test firing temperature and solve an equation for thrust coefficient as a function of thrust, pressure and throat dimension to yield an array of incremental thrust coefficient values, at the test firing temperature.

Second, the method develops predicted data profiles for a firing temperature selected by the user, comprising the additional steps as follows:

6$^{th}$: Process the test firing temperature and the temperature selected by the user in an expression for linear web burned, at the temperature selected by the user, as a function of the linear web burned, at the test firing temperature, the difference in the temperatures and a thermal expansion coefficient to solve for the linear web burned, at the temperature selected by the user for an array of integer numbered increments.

7$^{th}$: Process the array of burn surface values, at the test firing temperature, in an expression for the burn surface at the temperature selected by the user as a function of the burn surface, at the test firing temperature, the thermal expansion coefficient, the difference in temperatures and a burn surface modifier, which is given an initial default value of "1", and solve for an array of burn surface values, at the temperature selected by the user, for integer numbered increments.

8$^{th}$: Process the reference burn rate at the test firing temperature in an expression for the temperature dependency of the burn rate, and solve for an array of burn rate values at the temperature selected by the user, for integer numbered increments. The method uses the pressure exponent for the temperature selected by the user and the pressure value for a next preceding increment, in each integer numbered increment. The initial pressure prior to the first increment is given a default base line value.

9$^{th}$: Process the array of burn surface values, the array of burn rate values and the array of throat dimension values, in an expression for the pressure as a function of the burn surface, burn rate, propellant density, throat dimension, and characteristic velocity to solve for an array of pressure values at integer numbered increments. Each value in the array provides a pressure value for the next following increment of the 8$^{th}$ step.

10$^{th}$: Process the array of thrust coefficient values at the test firing temperature, in an expression for temperature dependence of the thrust coefficient to solve for an array of thrust coefficient values at the temperature selected by the user.

11$^{th}$: Process the arrays of thrust coefficient, pressure and throat dimension values, in an expression for thrust as a function of thrust coefficient, pressure and throat dimension to solve for an array of thrust values for integer numbered increments.

12$^{th}$: Process the arrays of linear web burned and burn rate at the temperature selected by the user in an expression for the time increment as a function of the linear web burned and burn rate to solve for an array of integer numbered time increments and assign the resulting time values to the integer numbered increments in the arrays for the temperature selected by the user.

13$^{th}$: Repeat the steps 6$^{th}$ through 12$^{th}$, in an iterative operation, varying the burn surface modifier, in an expression for incremental propellant weight burned as a function of incremental burn surface and incremental burn rate, both at the temperature selected by the user, solving for the total propellant weight burned and selecting the burn surface modifier which produces a total propellant weight burned matching the user input value for propellant weight. The method rebuilds the arrays, by repeating steps 6$^{th}$ through 12$^{th}$, using the selected burn surface modifier.

The foregoing method eliminates the need for knowing the actual geometry of the propellant-grain and makes use of test firing data, such as, pressure and thrust data versus time, and measured throat area, along with general propellant grain and motor design data, such as propellant weight and density, web thickness, propellant pressure coefficient, thermal expansion coefficient, and temperature sensitivity coefficient to develop a burnback profile. Additionally, the method uses the user input information together with the profiles it has generated to build data profiles for temperatures, for which no test firing data is available. The type of input data required is that which is readily available to personnel involved in the analysis on a given rocket motor.

DETAILED DESCRIPTION OF THE PREFERRED EMBODIMENT

Figure 1:
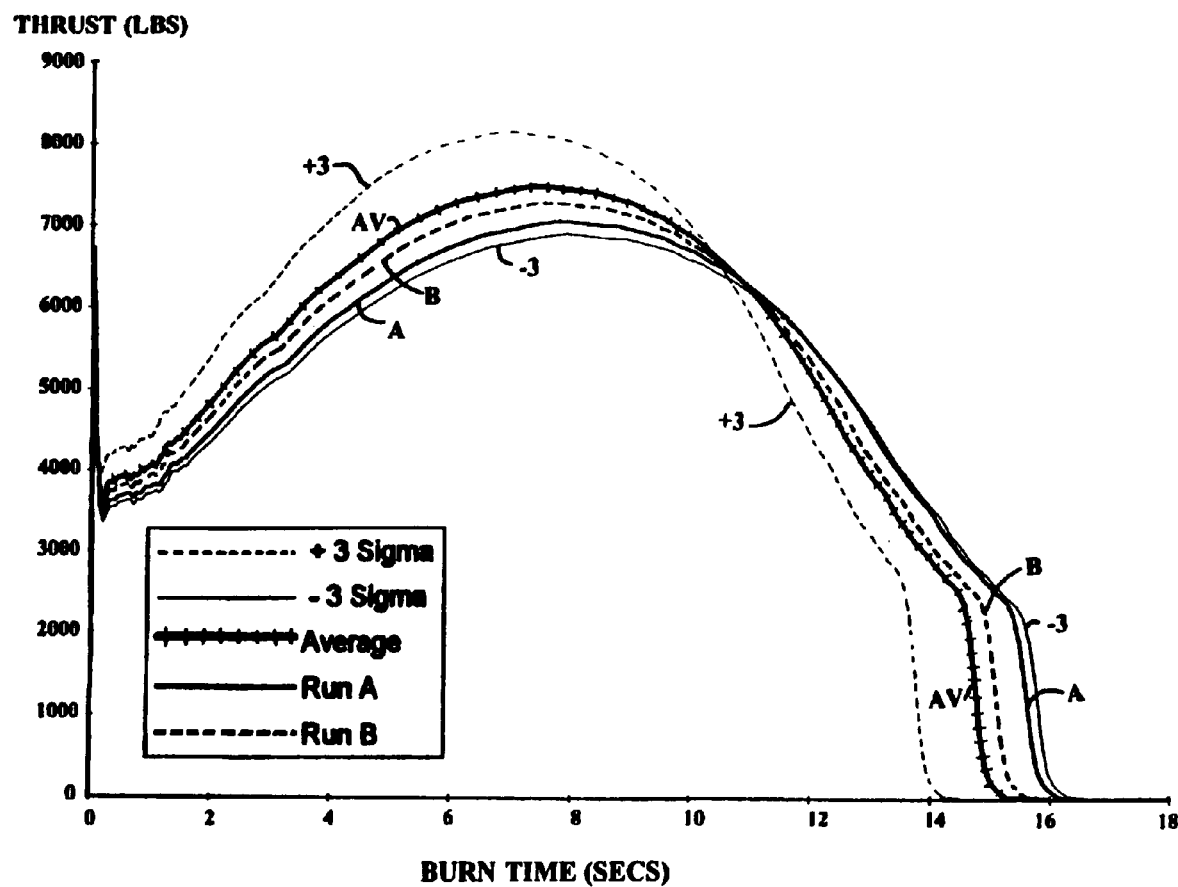
FIG. 1 is an exemplary profile of the thrust versus time for an existing propellant rocket.

The present invention is a method for using a computer model for generating rocket motor profiles as in FIG. 1, inclusive of throat area profiles and thrust coefficient profiles, all from readily available rocket motor specification data and test firing data. The present method facilitates the generation of burnback profiles and pressure and thrust versus time data at firing temperatures for which no test firing data is available. This data is valuable for predicting the ballistics performance of particular rocket motors at various temperatures.

Typically a user who is engaged in analysis of rocket motors has access to specifications including web thickness, propellant weight, propellant density, initial throat diameter, thermal expansion coefficient, temperature sensitivity coefficient and pressure exponent. The user also has access to the data from one or more test firings, usually at extreme temperatures. This data comprises values for thrust at time increments and chamber pressure at time increments.

The preferred embodiment of the present method is implemented in software form as a computer program comprising a main routine and a number of subroutines, the subroutines each performing an algorithmic calculation for collectively generating rocket motor burnback profiles and pressure and thrust versus time data from the existing data.

Figure 2:
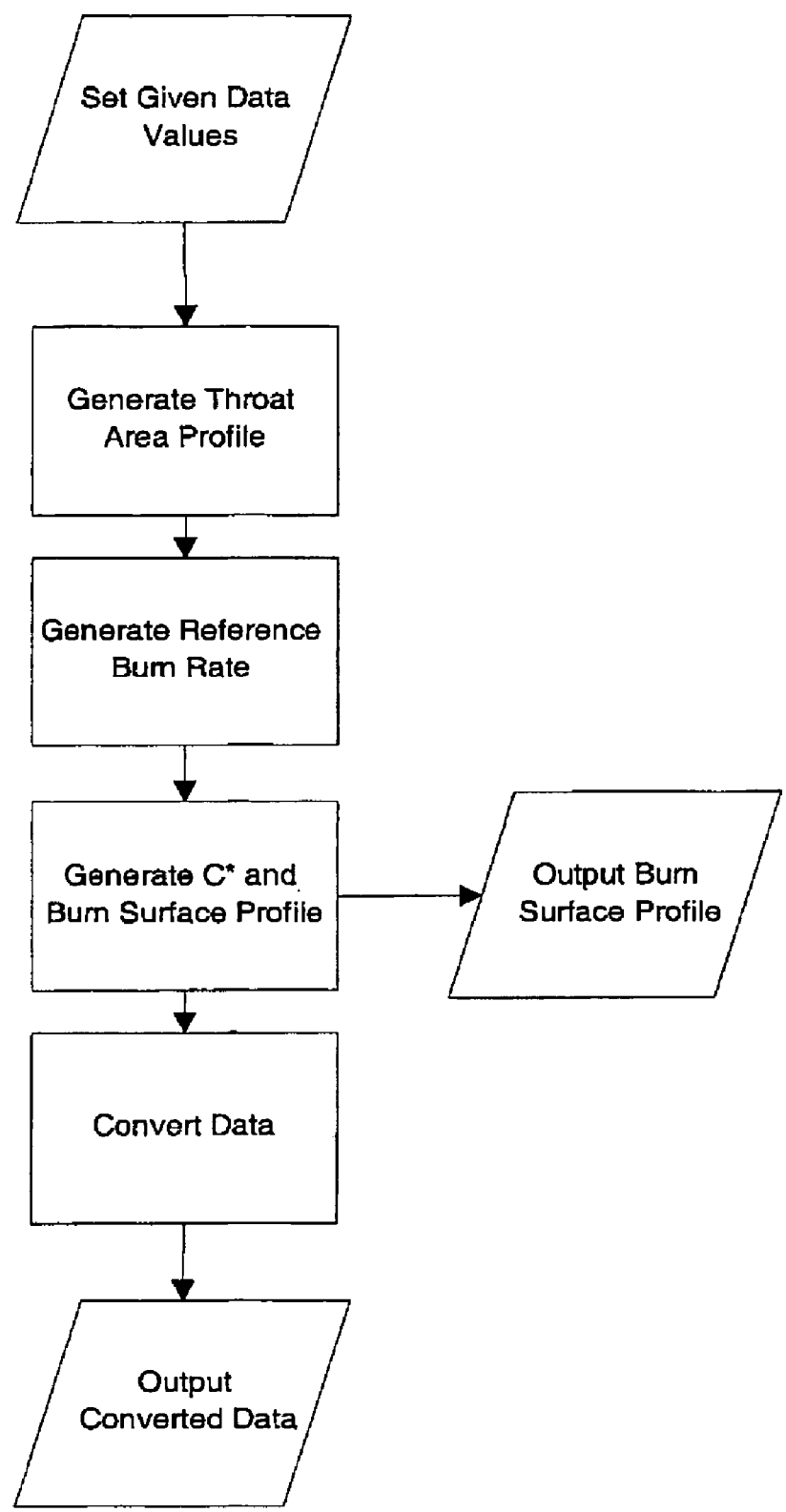
FIG. 2 is a flowchart used to derive the computer code showing a portion of the main routine of processing to subroutines and presentation.

FIG. 2 is a flowchart used to derive the main routine computer code, which begins by importing a data file containing the above described data: web thickness, propellant weight, propellant density data, initial throat diameter, thermal expansion coefficient, temperature sensitivity coefficient and pressure exponent data, and test firing data.

As seen in FIG. 2, the flowchart verifies the presence of required data elements and calls upon the subroutine calculations of the present invention.

The method then proceeds to a first subroutine which is designated as Private Sub SetErosion that produces a throat area profile at the test firing temperature. This first subroutine accounts for the fact that thrust is influenced by chamber pressure and the area of the throat, through which the products of combustion exit. The area of the throat changes during the operation of the rocket motor due to erosion. The rate of throat erosion is given as a rate of change in the radius of the throat as follows:

$$Ei = aPi^b \quad \text{[Equation \#1]}$$

Where:

$E_i$=Incremental radial erosion rate
$P_i$=Incremental chamber pressure
a=Empirically derived coefficient
b=Empirically derived coefficient The coefficient b is set at a constant value of 0.9240 which has been determined from experimental tests of rocket motors. The model varies the coefficient a; however, the difference in the throat area profile is not significant regardless of which coefficient is varied. The throat radius, at a given increment of time is given by the equation:

$$ri = (ri-1 + aPi^b(ti-ti-1)) \quad \text{[Equation \#2]}$$

Equation #2 incorporates the expression for the rate of change in throat radius due to throat erosion and yields the throat radius at a given increment of time and, when solved repeatedly for time increments over the period during which the motor operates, yields an array of incremental throat radius values.

At a given time increment, $\pi r^2$ yields the throat area at the time increment ti. The incremental throat area is given by the equation:

$$Ati = \pi ri^2 \quad \text{[Equation \#3]}$$

Figure 3:
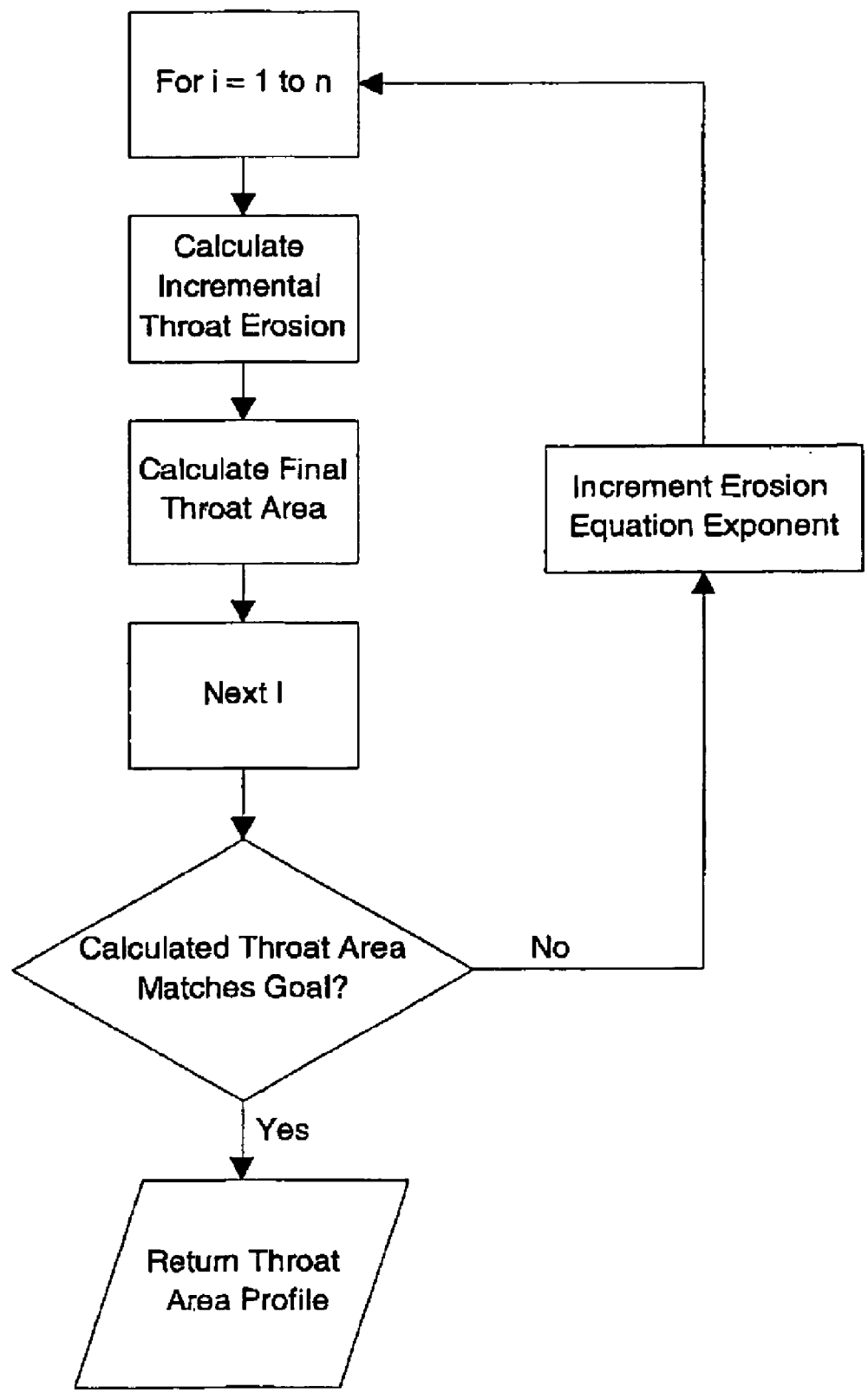
FIG. 3 is a flowchart used to derive the computer code subroutine for the iterative process to calculate the coefficient in the equation for the rate of throat erosion.

As shown derived from the relevant portions of the flowchart of FIG. 3, the subroutine designated as Private Sub SetErosion varies the coefficient a over a range of values and calculates the array of incremental throat radii, repeating the process until the final throat radius matches the final throat radius input by the user. In addition to the value for throat radius, the program can be designed to work with other dimensions of the throat, such as diameter or area. The Private Sub SetErosion subroutine uses the expression for the incremental throat radius, given by equation #2, in equation #3, including the selected value for a and solves equation #3 for each time increment to produce a throat area profile at the test firing temperature.

Figure 4:
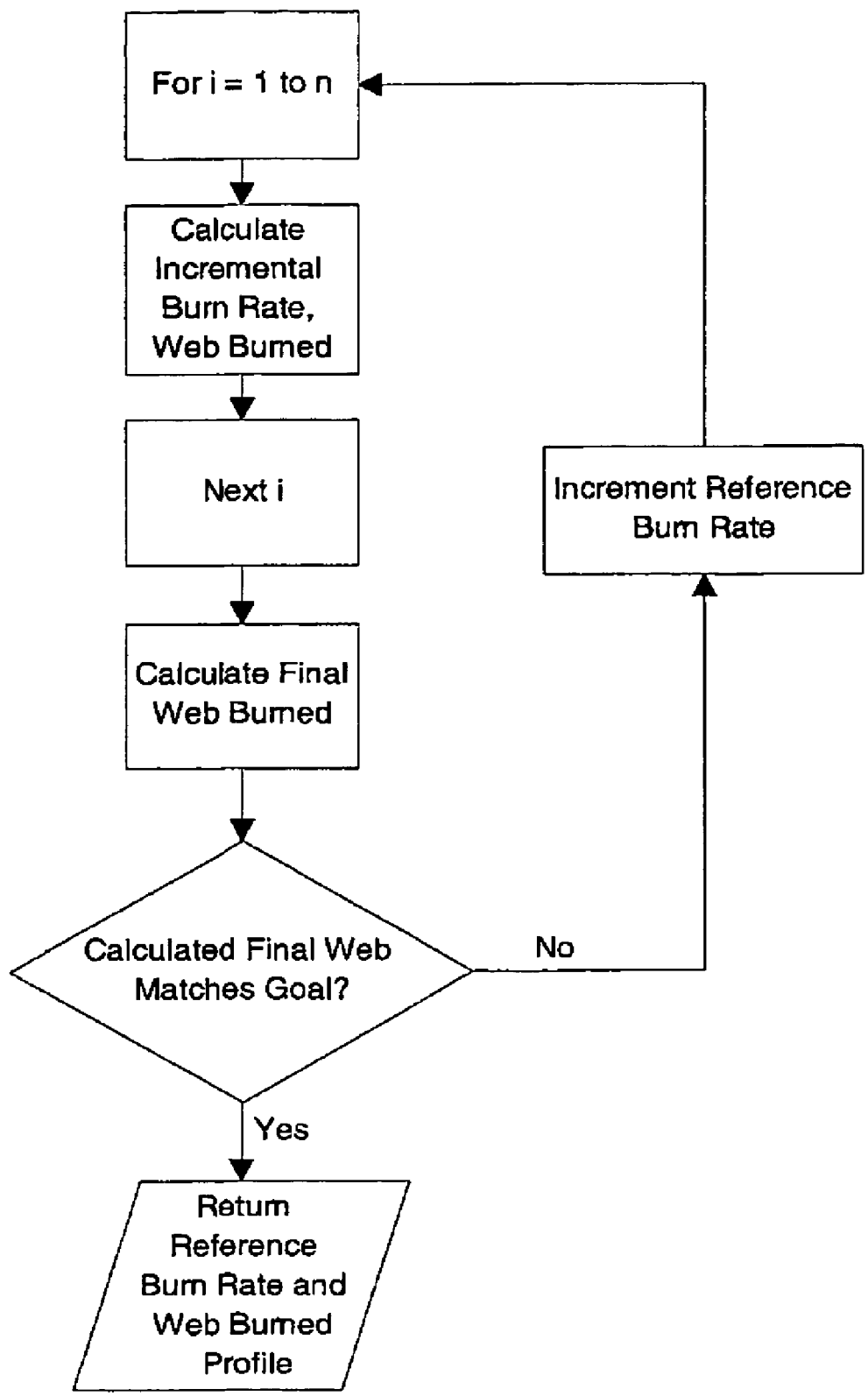
FIG. 4 is a flowchart used to derive the computer code subroutine for the iterative process to calculate the reference burn rate and for producing the web burned array.

The variables set forth in the Private Sub SetErosion subroutine derived from FIG. 3 is as follows:

Incremental chamber pressure at time increment "i"—PressIn (i)
Time increment "i"—TimeIn (i)
Incremental throat area—AtIn (i) and This Value Given the foregoing, the main program code then calls a second subroutine as derived from FIG. 4 and is designated Sub SetBurnRate, which varies the reference burn rate in an iterative process until the total linear web burned at the end of the firing matches the user input value for web thickness.

The incremental linear rate at which the web is burned is given by the equation:

$$\dot{r}_i = \dot{r}_{ref}\left(\frac{P_i}{P_{ref}}\right)^n \quad \text{[Equation \#4]}$$

Where:

$\dot{r}_{ref}$=Burn rate at reference pressure and motor conditioning temperature
$P_{ref}$=Reference pressure (model uses 1500 pounds per square inch)
n=Pressure exponent input by the user The total linear web burned as of time increment "i" is given by the equation:

$$wb_i = wb_{i-1} + \left(\frac{\dot{r}_{i-1} + \dot{r}_i}{2}\right)(t_i - t_{i-1}) \quad \text{[Equation \#5]}$$

Where: $wb_i$=Total linear web burned as of time increment "i"

The Private Sub SetBurnRate subroutine derived from the flowchart of FIG. 4 uses the expression for the incremental linear burn rate given by equation #4 and solves equation #5 repeatedly, varying the reference burn rate in an iterative process until the total linear web burned at the end of the firing matches the user input value for web thickness. The selected reference burn rate is the correct reference burn rate for the rocket motor fired at the test temperature. The model uses the expression for the incremental burn rate, given by equation #4, including the selected reference burn rate and solves equation #5, for each time increment to produce a web burned array for each time increment.

Figure 5:
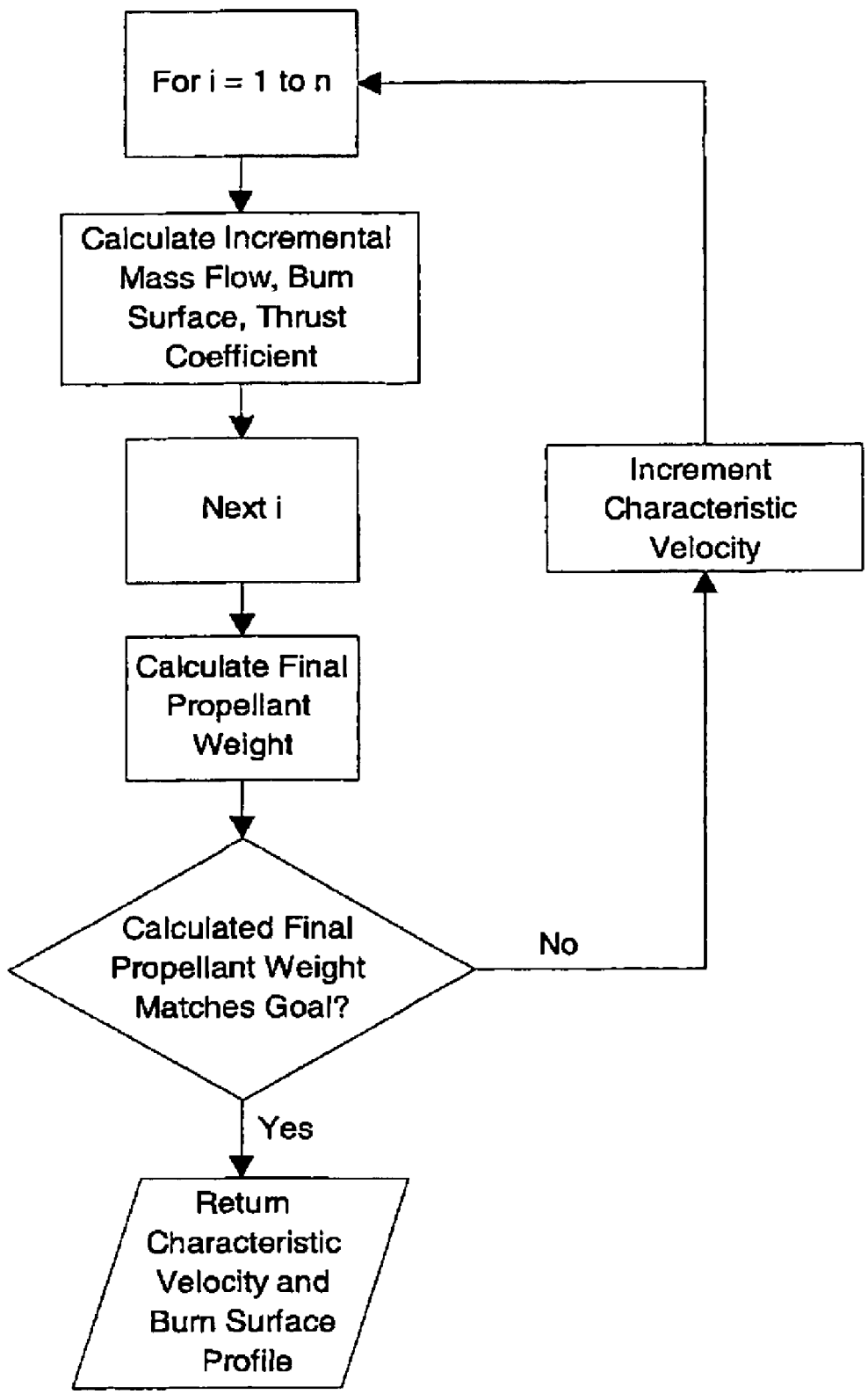
FIG. 5 is a flowchart used to derive the computer code subroutine for the iterative process to calculate the characteristic velocity and for producing the burn surface and thrust coefficient arrays.

The variables set forth in the foregoing equations are indicated in the code derived from the flowchart of FIG. 4 as follows:

Burn rate at reference pressure and motor conditioning temperature—rref
Reference pressure—PREF
Pressure exponent—nexp
Total linear web burned at time increment "i"—WburnIn (i) and ThisValue
Incremental linear burn rate—brate Given the foregoing, the main program code then calls a third subroutine as derived from the flowchart of FIG. 5 and designated Private Sub SetCStar which calculates the mass flow values and varies the characteristic velocity in an iterative process until the propellant weight burned at the end of the firing matches the actual value input by the user for the propellant weight.

The mass flow at a time increment "i" is a function of the incremental chamber pressure and the incremental throat area. The mass flow at a time increment "i" is given by the equation:

$$\dot{m}_i = \frac{P_i At_i g}{C^*} \qquad \text{[Equation \#6]}$$

Where:
C* Characteristic velocity
g Gravitational constant

The burn surface at time increment "i" is given by the equation:

$$S_i = \frac{\dot{m}_i}{\dot{r}_i \rho} \qquad \text{[Equation \#7]}$$

Where:
ρ is propellant density at firing temperature

The method assumes a default value of 0.065 for the propellant density although the user can input another value for the propellant density in the original data set.

The propellant weight burned as of a time increment "i" is given by the equation:

$$Pb_i = Pb_{i-1} + \left(\frac{\dot{m}_{i-1} + \dot{m}_i}{2}\right)(t_i - t_{i-1}) \qquad \text{[Equation \#8]}$$

The incremental thrust coefficient is given by the equation:

$$Cf_i = \frac{F_i}{P_i At_i} \qquad \text{[Equation \#9]}$$

Where: $F_i$ is thrust at increment "i"

The Private Sub SetCStar subroutine as derived from the flowchart of FIG. 5 uses equation #6 to provide the incremental mass flow values, with the characteristic velocity given an initial default value of 60,000. The model solves equations #4, #7, #8 and #9 for each time increment, repeatedly, varying the characteristic velocity in an iterative process and selecting the value of characteristic velocity which gives the propellant weight burned, given by Equation #8, at the end of the firing, matching the actual value input by the user for the propellant weight. The same subroutine also solves equations #7 and #9, for each time increment, using the selected value for characteristic velocity, to produce an array of burn surface and thrust coefficients, respectively for each time increment.

The variables set forth in the third subroutine Private Sub SetCStar as derived from the flowchart of FIG. 5 are represented as follows:

Characteristic velocity—CS.
Burn surface at time increment "i"—BsurfIn(i)
Mass flow at time increment "i"—mpdot
Incremental thrust coefficient—cfIn (i)
Propellant weight burned as time increment "i"—ThisValue The total web burned and the burn surface arrays may be combined in a graph of points at matching time increments to produce a burnback profile which integrates to the correct total propellant volume burned during the test firing. The arrays of thrust coefficient and burn rate data form valuable profiles. This collection of information is valuable in analysis of the rocket motor and also forms the basis for the prediction of the ballistics performance of the rocket motor at temperatures for which no test firing data is available. The method uses the terminology "output temperature" to refer to the temperature to be modeled as selected by the user and the terminology "input temperature" to refer to the temperature for which test firing data is available.

Figure 6:
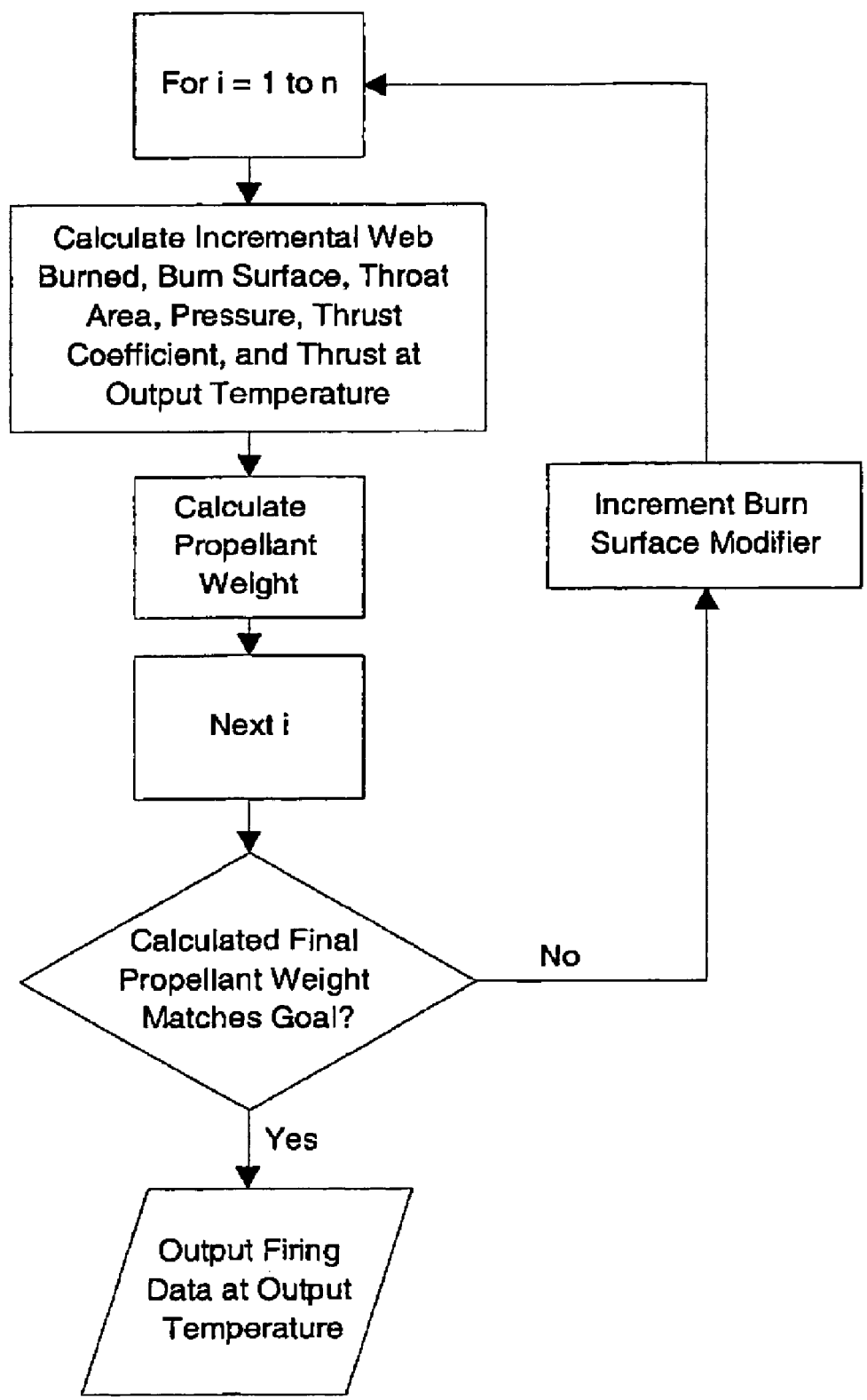
FIG. 6 is a flowchart used to derive the computer code subroutine for the iterative process to calculate the burn surface modifier and for producing the burnback profile.
Figure 7:
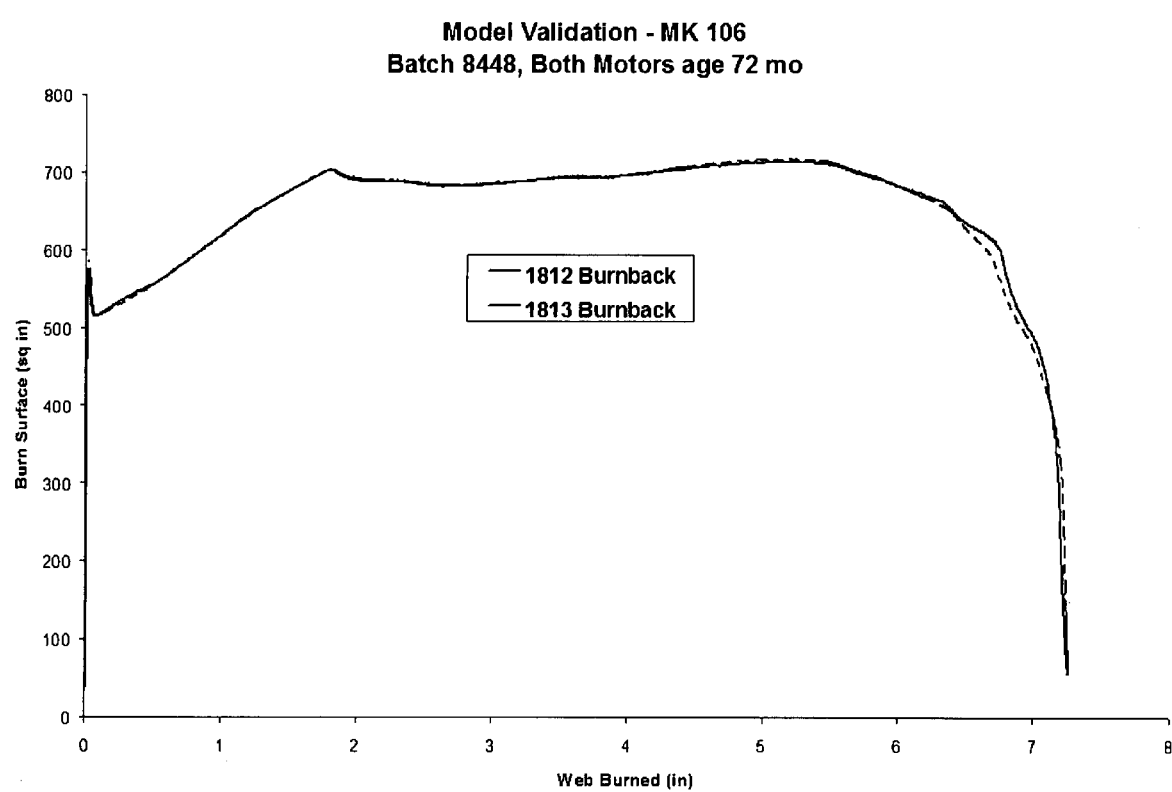
FIG. 7 is a burnback profile generated by the present invention for two MK 106 rocket motors.

Given the foregoing, the main program code then calls a fourth subroutine as derived from the flowchart of FIG. 6 and designated Private Function GenerateOutput, which calculates a prediction of the ballistics performance of the rocket motor at any given temperature, including those at which no test firing data is available.

The web at the output temperature differs from the web, at the input temperature due to thermal expansion. The web, at the output temperature is a function of the web, at the input temperature, multiplied by a thermal expansion coefficient, a', proportioned by the difference in temperatures, as follows:

$$wb_{out} = wb_{in}(1 + a'(T_{out} - T_{in})) \qquad \text{[Equation \#10]}$$

The user has the option of selecting the web, at the output temperature, in which case, the thermal expansion coefficient is derived by the model using the expression:

$$a' = \frac{\frac{wb_{out}}{wb_{in}} - 1}{T_{out} - T_{in}}$$

The burn surface at the output temperature is given by the equation:

$$S_{out_i} = (1 + 2 \times a'(T_{out} - T_{in})) S_{in_i} \times BS_{Modifier} \qquad \text{[Equation \#11]}$$

The incremental burn rate is temperature dependent and, for the output temperature, is calculated, using Equation #4, with the temperature dependent variables adjusted, as follows $$r_{out_i} = r_{ref_{out}} \left(\frac{P_{i-1}}{P_{ref}}\right)^{n_{out}} \quad \text{[Equation #12]}$$

Where: $n_{out}$ is the pressure exponent at the output temperature $$r_{ref_{out}} = r_{ref_{in}} \times e^{\sigma_p(T_{out} - T_{in})}$$

The temperature sensitivity coefficient, σp, is input by the user but has a default value of 0.001.

The Private Function GenerateOutput subroutine as derived from the flowchart of FIG. 6 defines variables as follows:

Reference burn rate at the output temperature—OutBurnRate
Reference burn rate at the input temperature—InBurnRate
e—E
Temperature sensitivity coefficient—SigmaP
Output temperature—OutTemp
Input temperature—InTemp The values for characteristic velocity and the rate of throat erosion are applied to the equations which determine the relationship of the variables, using the values for the output temperature to predict the ballistics performance of the rocket motor at the output temperature. Equation #7 can be expressed as follows:

$$\dot{m}_{out_i} = r_{out_i} S_{out_i} \rho_{out} \quad \text{[Equation #13]}$$

Where: $\rho_{out}$=Propellant density at the output temperature

Normally, the final-throat area is not temperature dependent; however, the method allows the user to select a different final throat area, in which case the method provides an expression for the incremental throat area to be substituted for the incremental throat area taken from the throat area profile generated from equation #3, as follows:

$$At_{out_i} = At_0 + \frac{(At_{in_i} - At_0)}{(At_F - At_0)}(At_F - At_0) \quad \text{[Equation #14]}$$

Where:
At0= Initial throat diameter
Atini= Incremental input throat diameter calculated from input data
AtF= Actual final throat diameter
AtFout= Output final throat diameter The expression for the mass flow, given by equation #13, is substituted into equation #6, which is rewritten as follows:

$$P_i = \left(\frac{\dot{m}_{out_i} C^*}{At_{out_i} g}\right) \quad \text{[Equation #15]}$$

The variables set forth in the Private Function GenerateOutput subroutine as derived from the flowchart of FIG. 6, are as follows:

Linear web burned at increment "i", at output temperature—WburnOut (i)
Web depth at input temperature—InWebDepth
Web depth at output temperature—OutWebDepth
Incremental burn surface at output temperature—BsurfOut (i)
Incremental chamber pressure at output temperature—PressOut (i)
Incremental throat area at output temperature—AtOut (i)
Initial throat area—AtO
Final throat area—AtF
Final throat area at output temperature—AtFOut The thrust, at the output temperature, depends on the thrust coefficient according to Equation #9. The temperature dependence of the thrust coefficient is determined as follows:

$$cf_{out_i} = cf_{in_i}\left[1 + Cf_{Factor}\left(\frac{(T_{out} - T_{in})}{100}\right)\right] \quad \text{[Equation 16]}$$

Where
Factor to account for percent change in thrust coefficient per 100° F. This factor is 0 by default, but can be changed by the user.

Equation #9 is rewritten to give an expression for thrust, as follows:

$$F_{out_i} = C_{f_{out_i}} P_{ci} At_{out_i} \quad \text{[Equation 17]}$$

The variables set forth in the computer model, as derived from the flowchart of FIG. 6 are as follows:
Incremental thrust at output temperature—ThrustOut (i)
Output temperature—trefout
Input temperature—trefin The subroutine uses equations #10 through #17 to develop arrays of integer numbered incremental values based on the arrays of values for web burned, burn surface, reference pressure, throat area and thrust coefficient, all at the output temperature. The time associated with each increment, at the output temperature is derived from the linear web burned and the burn rate, at the output temperature and given by the equation:

$$t_{out_i} = t_{out_{i-1}} + \left(\frac{wb_{out_i} - wb_{out_{i-1}}}{\&_{out_i}}\right) \quad \text{[Equation 18]}$$

The subroutine solves Equations #10 through #18 for each integer numbered increment and also solves Equation #8 for total propellant weight burned. Equation #12 is dependent on the pressure, at the output temperature, for the preceding increment, so the process begins with a default pressure of 14.7, for the increment i−1, and writes the pressure derived from Equation #15, into each succeeding calculation of Equation #12. The subroutine solves the referenced equations, repeatedly, in an iterative operation, varying the burn surface modifier and selecting the burn surface modifier which produces a total propellant weight burned, from Equation #8, matching the user input propellant weight. The subroutine uses the selected burn surface modifier to generate the burnback profile, thrust coefficient versus time, pressure versus time and thrust versus time, all for the user selected firing temperature. The burnback profile and thrust versus time data are output in graph form, as shown in FIGS. 7–14. Burn surface profiles, for various rocket motors, which the method has generated appear as FIGS. 7,9,11 and 13. From this information, a complete analysis of the ballistics performance of the rocket motor can be predicted, for a firing temperature selected by the user, without the burden and expense of test firing the rocket motor at the selected temperature.

Figure 8:
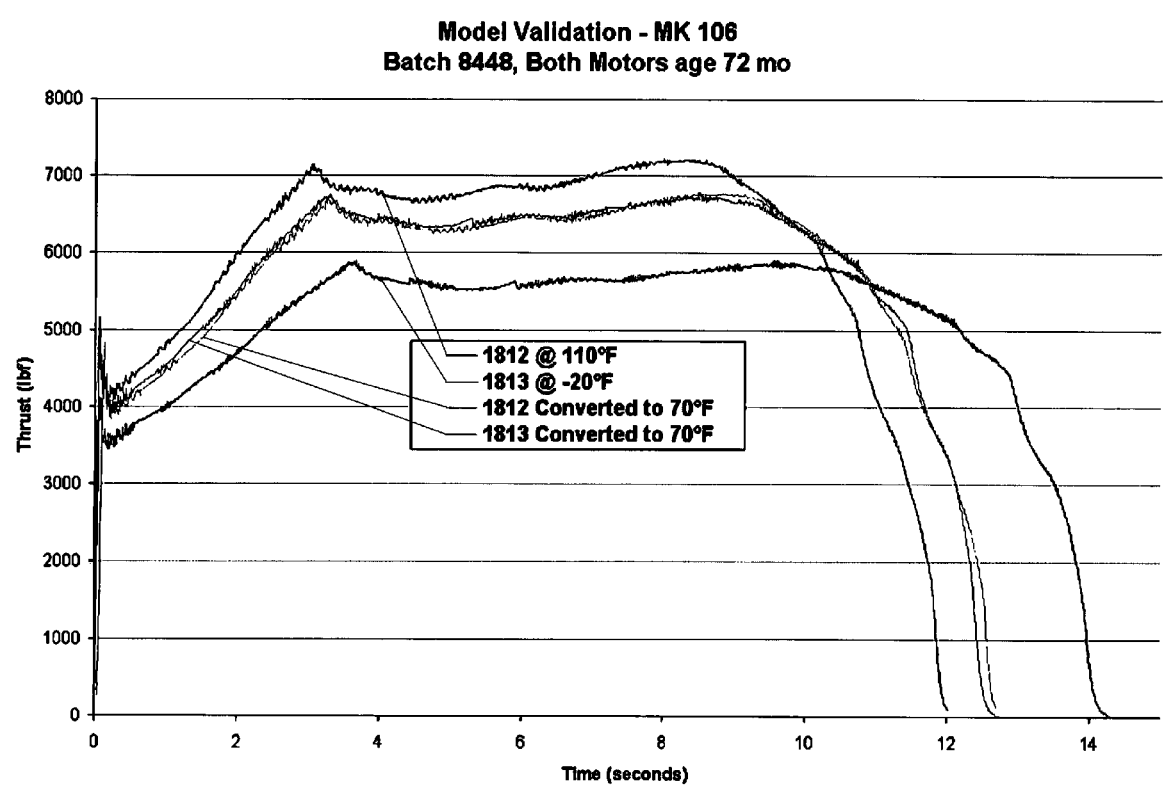
FIG. 8 is a graph of thrust versus time for MK 106 rocket motors showing test firing results and modeled predictions using the present invention.
Figure 9:
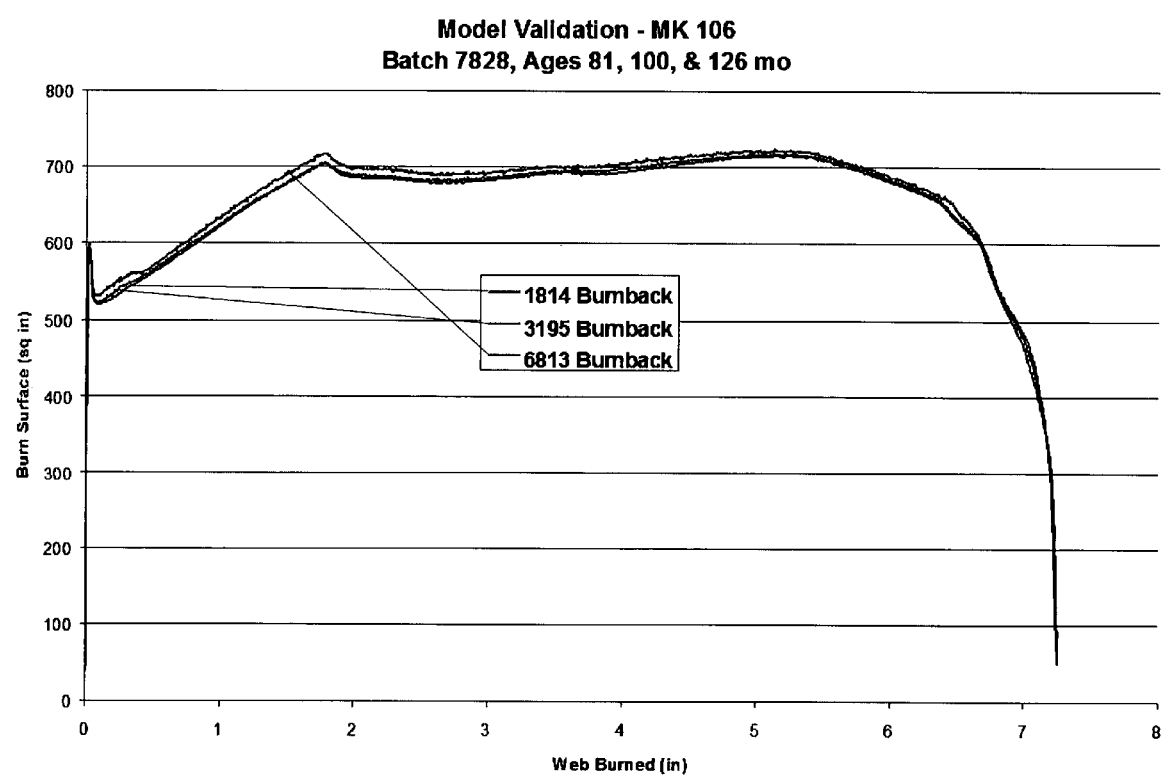
FIG. 9 is a burnback profile generated by the present invention for three MK 106 rocket motors.
Figure 10:
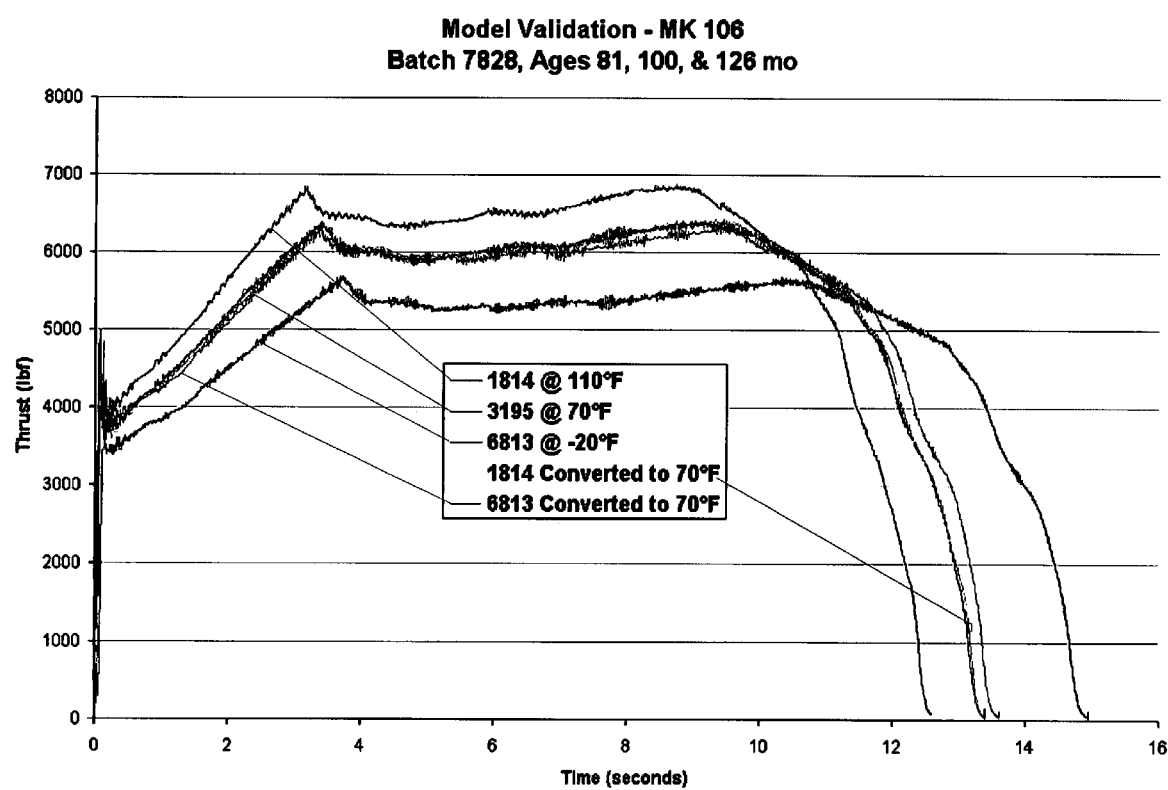
FIG. 10 is a graph of thrust versus time for MK 106 rocket motors showing test firing results and modeled predictions using the present invention and including a test firing at the same temperature used by the model.
Figure 11:
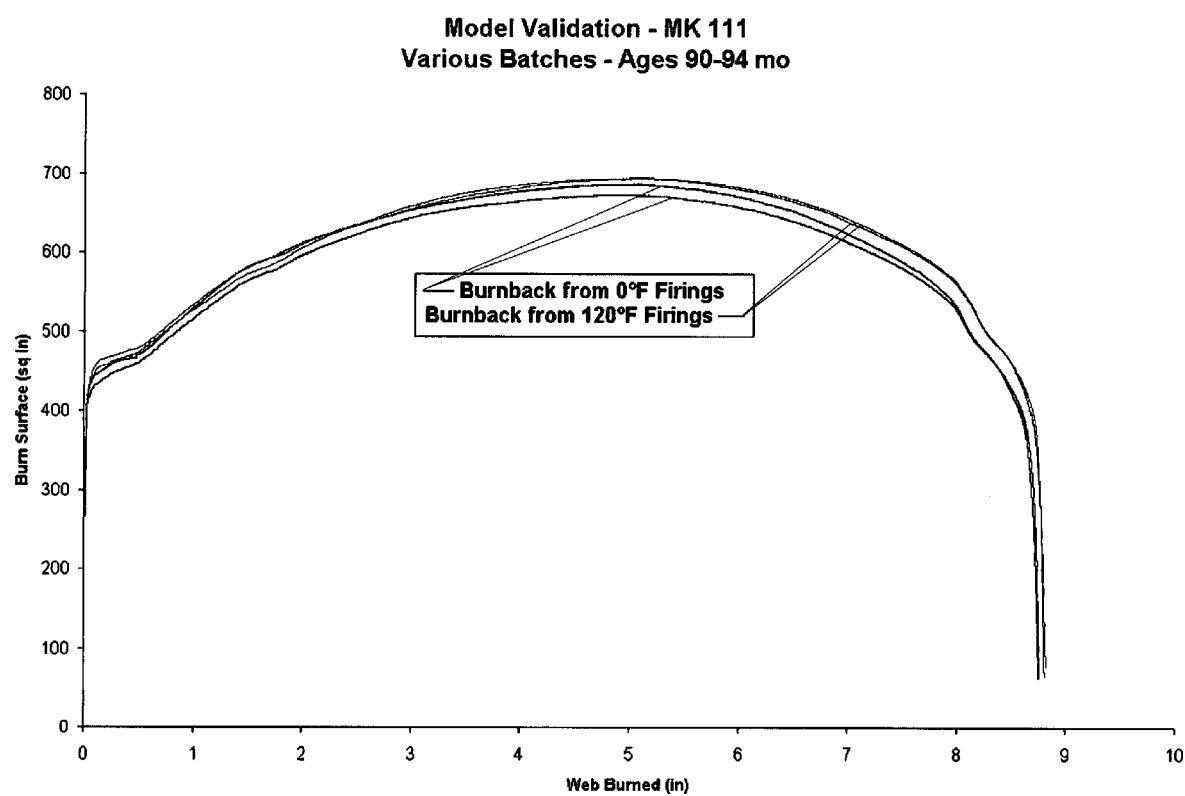
FIG. 11 is a burnback profile generated by the present invention for MK 111 rocket motors.
Figure 12:
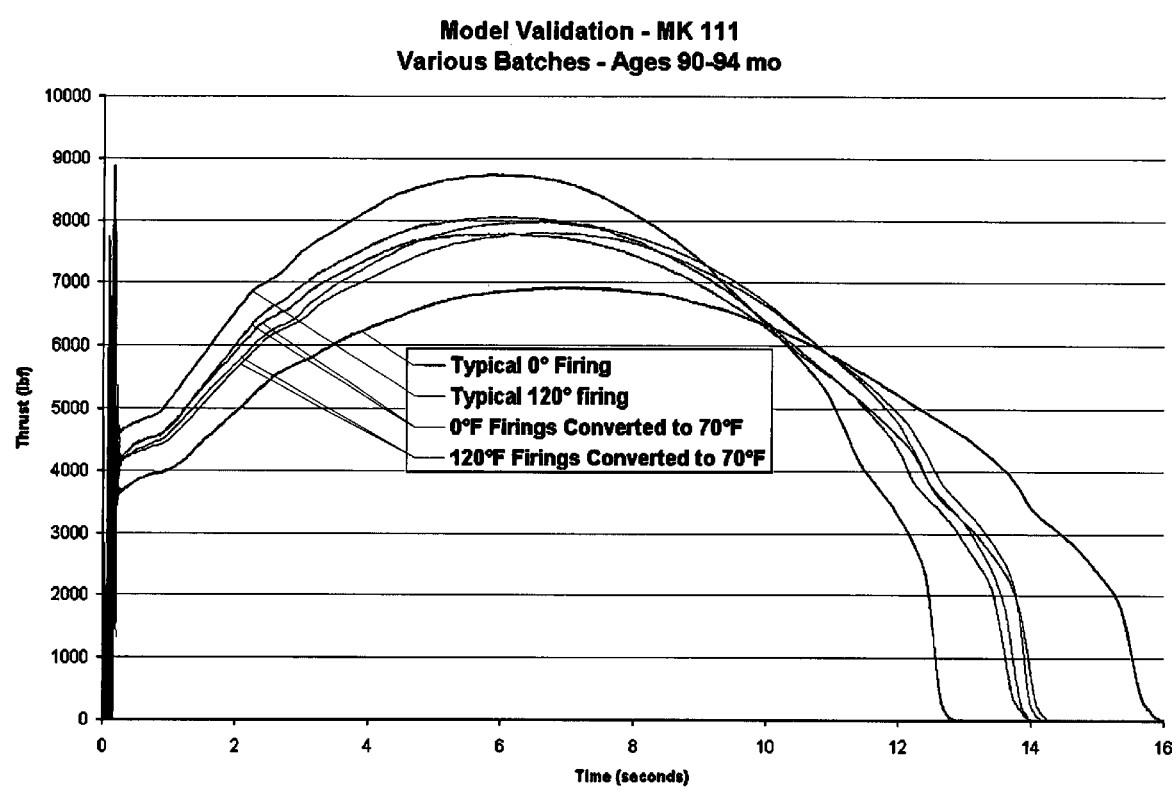
FIG. 12 is a graph of thrust versus time for MK 111 rocket motors showing test firing results and modeled predictions using the present invention.
Figure 13:
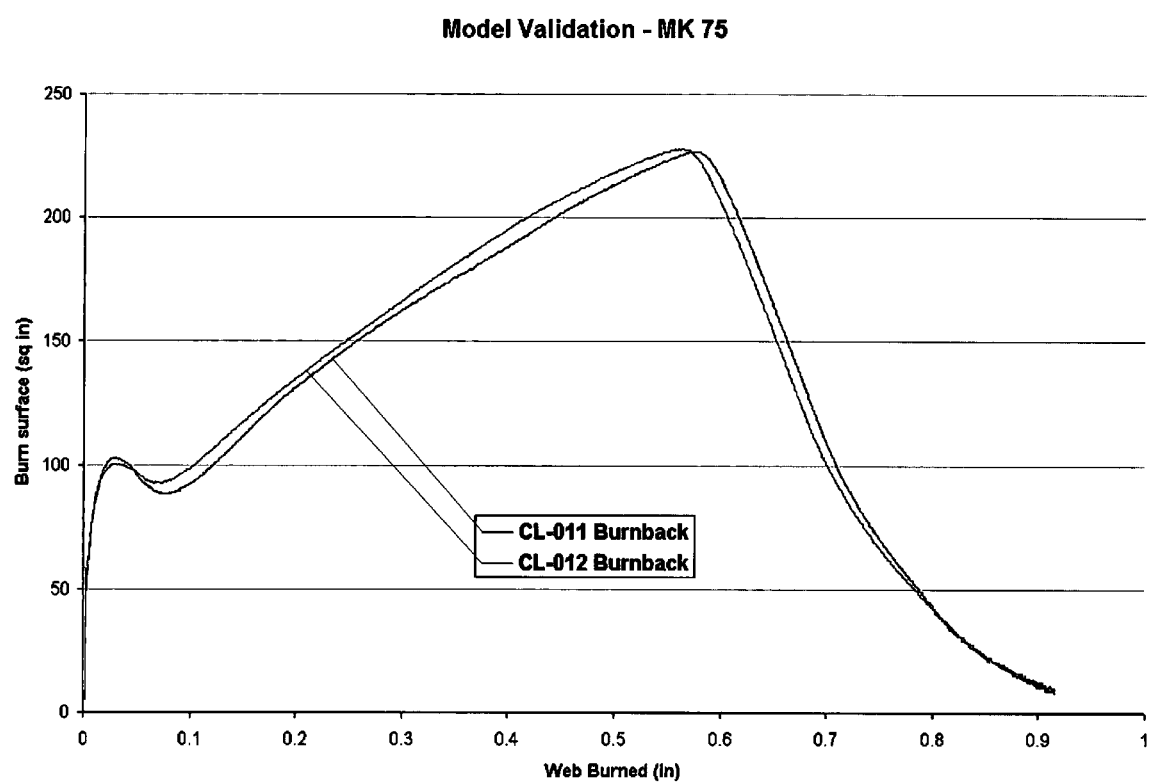
FIG. 13 is a burnback profile generated by the present invention for MK 75 rocket motors.
Figure 14:
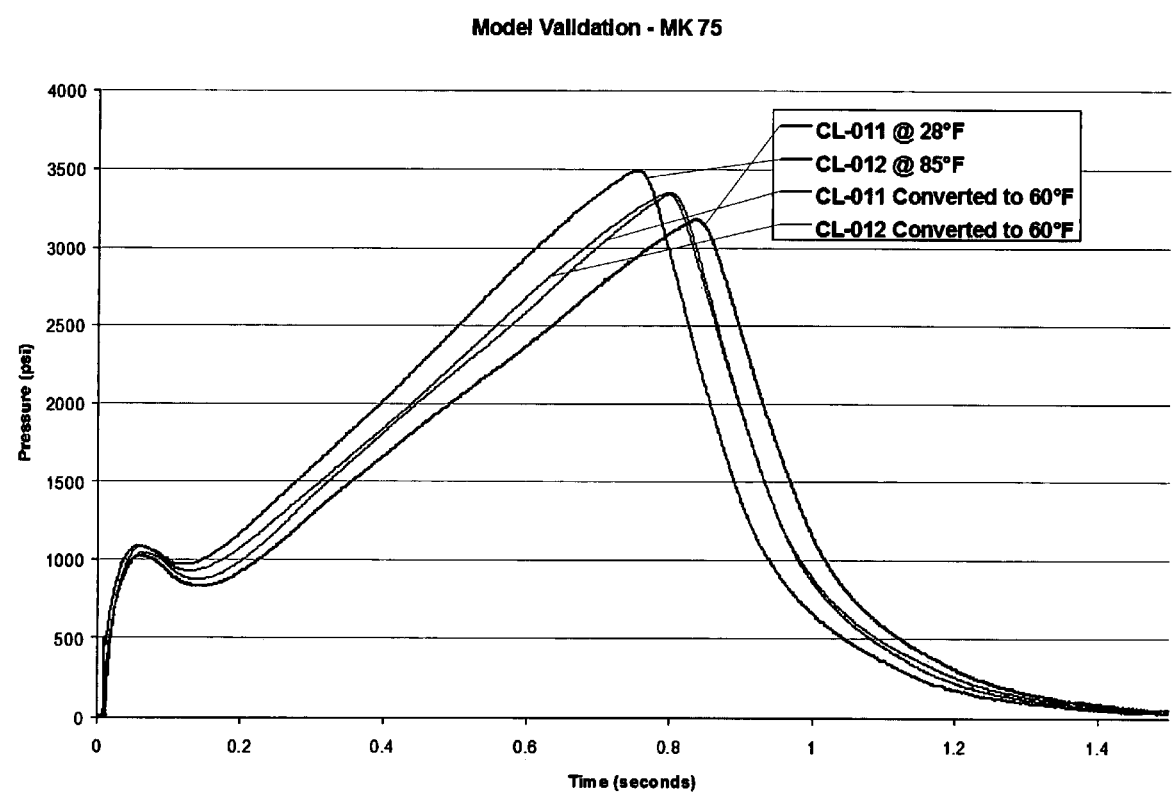
FIG. 14 is a graph of thrust versus time for MK 75 rocket motors showing test firing results and modeled predictions using the present invention.

The method of the present invention was used to predict the ballistics performance of an MK 106 rocket motor using test firing data from a high extreme temperature as the input temperature and also to predict the ballistics performance of the same type of motor using test firing data from a low extreme temperature. In each case, the output temperature was selected as 70 degrees. The results are shown in FIG. 8, and represent a close correlation of the two method outputs for a 70 degree firing temperature as well as a consistent result for a firing temperature between the two extreme temperatures. The process was repeated for MK 106 rocket motors of greater age and produced consistent results, as shown in FIG. 10. FIG. 10 also shows the thrust versus time curve of a test firing at 70 degrees, which presents a close match with the prediction generated by the method. The same process was performed using MK 111 rocket motors, with results shown in FIG. 12 and on the MK 75 rocket motor, as shown in FIG. 14.

Having fully described the present invention, it will be appreciated that minor variations in the manipulation of the data may be used to produce the same results, without departing from the essence of the invention disclosed herein.

I claim:

1. A method for developing rocket motor ballistics performance at an output temperature, comprising:
   receiving input data comprising data from an actual test firing using an input temperature and rocket motor specifications;
   selecting a coefficient of throat erosion by iteratively solving an expression for rate of throat erosion as a function of said input data until a throat dimension matches a user input value;
   calculating an array of throat dimension by time increment with the selected coefficient of throat erosion;
   selecting a reference burn rate by iteratively solving an expression for total web burned as a function of said input data until total linear web burned matches the user input value for web thickness;
   calculating an array of linear web burned values at the input temperature with the selected reference burn rate;
   selecting a characteristic velocity by iteratively solving an expression for total propellant weight burned as a function of said input data until a total propellant weight burned matches a user input value;
   calculating an array of burn surface values at the input temperature with the selected characteristic velocity; and
   developing data profiles at an output temperature selected by the user.

2. The method according to claim 1, wherein said step of receiving input data further comprises receiving a firing temperature, initial throat diameter, final throat diameter, pressure versus time and thrust versus time.

3. The method according to claim 1, wherein said rocket motor specifications further include propellant weight, propellant density data for a range of temperatures, web thickness, pressure exponent data for a range of temperatures, thermal expansion coefficient, and temperature sensitivity coefficient.

4. The method according to claim 1, wherein said step of developing data profiles at an output temperature selected by the user further comprises:
   determining an incremental array of linear web burned values, at the output temperature selected by the user;
   determining an incremental array of burn surface values, at the output temperature selected by the user; and
   determining an incremental array of burn rates, at the output temperature selected by the user.

5. A computer program embedded on a computer-readable medium with method steps of predicting rocket motor ballistics performance at a user selected output temperature, comprising:
   receiving input of data from at least one test firing, and rocket motor specifications including firing temperature, initial throat dimension, final throat dimension, propellant weight, propellant density data, web thickness, pressure exponent data, and pressure versus time;
   processing the pressure data in an iterative operation, varying a coefficient in an expression for the rate of throat erosion, as a function of pressure, to solve for a final throat dimension and selecting the coefficient of throat erosion which produces a final throat dimension matching the user input value;
   calculating an array of incremental values of throat dimension with the selected coefficient of throat erosion;
   processing the pressure and pressure exponent data in an iterative operation, varying a reference burn rate, in an expression for linear web burned as a function of pressure, reference pressure, reference burn rate and the pressure exponent, to solve for the total linear web burned and selecting the reference burn rate which produces a total linear web burned matching the user input value for web thickness;
   calculating an array of incremental values of burn rate at the input temperature and linear web burned at the input temperature, with the selected reference burn rate;
   processing the pressure and throat dimension data in an iterative operation, varying a characteristic velocity in an expression for propellant weight burned as a function of pressure, characteristic velocity, and throat dimension to solve for total propellant weight burned and selecting the characteristic velocity which produces the user input value for propellant weight;
   calculating an array of incremental values of burn surface at the input temperature, with the selected characteristic velocity;
   processing the arrays of values at the input temperature, for incremental throat dimension, linear web burned, and burn surface using equations expressing temperature dependence of the linear web burned and burn surface said equation expressing temperature dependence of burn surface including a burn surface modifier, and repeatedly solving equations for incremental values at the output temperature selected by the user, in an iterative operation varying the burn surface modifier, in an equation for total propellant weight burned and selecting the burn surface modifier which generates a propellant weight burned matching the user input value of propellant weight;

calculating an array of incremental values of linear web burned and an array of incremental values of burn surface, using the selected burn surface modifier, both at the user selected output temperature;

combining the burn surface values with the linear web burned values to form a burnback profile of the rocket motor, for the output temperature selected by the user.

6. The method of claim 5, wherein the equation for total propellant weight burned is a function of burn surface, including the burn surface modifiers, and a function of burn rate values, which are generated from the pressure exponent data.

7. The method of claim 5, further comprising:

receiving thrust versus time data for the input temperature;

processing the thrust and pressure data with the array of throat dimension values to solve an equation for a thrust coefficient as a function of thrust, pressure and throat dimension to yield an array of incremental thrust coefficient values, at the test firing temperature;

processing the reference burn rate, at the input temperature in an expression for the burn rate, at the output temperature selected by the user as a function of pressure, at a preceding increment, and the pressure exponent to yield an array of burn rates, for integer numbered increments, at the output temperature selected by the user;

processing the arrays of values for burn surface, burn rate, both at the output temperature selected by the user, and throat dimension in an expression for pressure as a function of burn surface, burn rate and throat dimension to solve for an array of pressure values at the output temperature selected by the user; and processing the arrays of linear web burned and burn rate, at the output temperature selected by the user in an expression for the time increment as a function of the linear web burned and the burn rate to solve for an array of integer numbered time increments and assigning the resulting time values to the integer numbered increments in the arrays for the output temperature selected by the user.

8. The method of claim 7, further comprising solving an equation for thrust coefficient at the output temperature selected by the user as a function of the thrust coefficient at the input temperature and the difference in temperatures, to yield an array of thrust coefficients at integer numbered increments and assigning said resulting time values to the increments and solving for incremental thrust in an equation for incremental thrust as a function of incremental chamber pressure, incremental throat dimension and incremental thrust coefficient, to yield an array of incremental thrust values for the output temperature selected by the user.

9. The method of claim 5, wherein said step of processing the arrays of values includes using an equation expressing temperature dependence of the incremental throat dimension.

10. A method for predicting rocket motor ballistic performance at a user-selected output temperature, comprising:

developing rocket motor data profiles at an input temperature, said data profiles including an array of incremental thrust coefficient values at the input temperature; and developing predicted rocket motor ballistic performance for the user-selected output temperature based on the rocket motor data profiles, said predicted rocket motor data profiles including an incremental array of thrust values as a function of thrust coefficient, pressure and throat dimension;

wherein said rocket motor ballistic performance is predicted absent an actual propellant grain geometry.

11. The method according to claim 10, wherein said step of developing rocket motor data profiles at an input temperature further comprises:

receiving input of data from at least one test firing, including firing temperature, initial throat dimension, final throat dimension, propellant weight, propellant density, web thickness, pressure exponent data, pressure versus time and thrust versus time;

processing the pressure data in an iterative operation, varying the coefficient in the expression for the rate of throat erosion, as a function of pressure, to solve for the final throat dimension and selecting the coefficient of throat erosion which produces a final throat dimension matching the user input value;

calculating an array of incremental values of throat dimension with the selected coefficient of throat erosion;

processing the pressure and pressure exponent data in an iterative operation, varying the reference burn rate, in an expression for linear web burned as a function of pressure, reference pressure, reference burn rate and the pressure exponent, to solve for the total linear web burned and selecting the reference burn rate which produces a total linear web burned matching the user input value for web thickness;

calculating an array of incremental values of linear web burned with the selected reference burn rate;

processing the pressure and throat dimension data in an iterative operation, varying a characteristic velocity in an expression for propellant weight burned as a function of pressure, throat dimension and characteristic velocity and selecting the characteristic velocity which produces the propellant weight burned matching the user input value for propellant weight;

calculating an array of incremental values of burn surface with the selected characteristic velocity.

12. The method according to claim 11, wherein said step of developing predicted rocket motor data profiles for a user-selected firing temperature further comprises:

receiving input of pressure exponent data, thermal expansion coefficient and arrays of incremental data from a test firing at an input temperature including incremental throat dimension, incremental linear web burned, incremental burn rate and incremental burn surface;

processing the array of values for incremental thrust coefficient using an equation expressing temperature dependence and calculating an array of thrust coefficient values at the user selected output temperature;

processing the arrays of values at the input temperature in expressions for linear web burned and burn surface, both at the user selected output temperature, said expression for burn surface including a burn surface modifier having a default value, to calculate arrays of linear web burned and burn surface at the user selected output temperature;

processing the pressure exponent data to calculate an array of burn rate values at the user selected output temperature using an expression for burn rate as a function of pressure at a next prior increment, wherein said process includes calculating a pressure value for use as a pressure value at a next prior increment by solving an expression for pressure as a function of burn rate, burn surface and throat dimension;

solving an equation for propellant weight burned repeatedly in an iterative process varying the burn surface modifier and selecting the burn surface modifier which produces a propellant weight burned matching the user input propellant weight;

processing the arrays of linear web burned and burn rate, both at the user selected output temperature in an expression for incremental time, assigning time increments to arrays of values for linear web burned, burn surface, burn rate, throat dimension and thrust coefficient and recalculating the arrays of values using the selected burn surface modifier; and processing the arrays of values for thrust coefficient throat dimension, burn rate and burn surface in an expression for thrust, to calculate an array of time incremental thrust values for the user selected output temperature.

13. The method of claim 12, wherein the array of values for throat dimension at the user selected output temperature is generated from an equation expressing temperature dependence of throat dimension.

14. A method for predicting rocket motor ballistic performance at a user-selected output temperature, comprising:

inputting an actual throat diameter of a rocket motor;

inputting a value for web burned;

measuring pressure data at a test firing of said rocket motor;

using said measured pressure data in a predetermined throat diameter equation and varying coefficients therein until a calculated final throat diameter matches said actual throat diameter;

using the measured pressure data in a predetermined web burned equation and varying a reference burn rate therein until a calculated web burned matches said user input value for web burned; and using the measured pressure data, calculated web burned, and calculated throat diameter to derive a burnback profile.

15. The method according to claim 14, further comprising using said burnback profile to iteratively generate output pressure and thrust versus time data at said user selected output temperature.

* * * * *